United States Patent
Dogan et al.

(10) Patent No.: US 9,942,020 B1
(45) Date of Patent: Apr. 10, 2018

(54) MINIMUM DELAY SPATIO-TEMPORAL FILTERING FOR INTERFERENCE REJECTION

(71) Applicant: Cisco Technology, Inc., San Jose, CA (US)

(72) Inventors: Mithat C. Dogan, San Jose, CA (US); Brian D. Hart, Sunnyvale, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/497,558

(22) Filed: Apr. 26, 2017

(51) Int. Cl.
| | |
|---|---|
| *H04B 1/10* | (2006.01) |
| *H04L 5/00* | (2006.01) |
| *H04B 7/0413* | (2017.01) |
| *H04W 72/08* | (2009.01) |
| *H04W 72/04* | (2009.01) |

(52) U.S. Cl.
CPC ......... *H04L 5/0062* (2013.01); *H04B 7/0413* (2013.01); *H04L 5/0098* (2013.01); *H04W 72/0453* (2013.01); *H04W 72/082* (2013.01)

(58) Field of Classification Search
CPC .... H04B 1/7117; H04B 1/712; H04B 1/7107; H04B 1/7115; H04B 1/707; H04B 1/123; H04B 7/002; H04B 1/109; H04L 1/06; H04L 25/0204
USPC ................ 375/130–153, 229–236, 259–285, 375/316–352
See application file for complete search history.

(56) References Cited

U.S. PATENT DOCUMENTS

| | | | | |
|---|---|---|---|---|
| 6,426,983 B1 * | 7/2002 | Rakib | ................... | H04B 1/7102 |
| | | | | 375/346 |
| 7,298,696 B1 * | 11/2007 | Wu | ........................ | H04L 1/0015 |
| | | | | 370/229 |
| 7,539,259 B2 * | 5/2009 | Dias | .......................... | H04B 7/04 |
| | | | | 375/260 |
| 7,561,644 B2 * | 7/2009 | Krupka | .................... | H04B 1/10 |
| | | | | 375/316 |
| 8,000,421 B2 * | 8/2011 | Takano | .................... | H04B 7/02 |
| | | | | 375/260 |
| 8,064,428 B2 * | 11/2011 | Bar-Ness | ............. | H04B 7/0623 |
| | | | | 370/252 |

(Continued)

OTHER PUBLICATIONS

Alexandr M. Kuzminskiy and HamidReza Karimi, "Multiple-Antenna Interference Cancellation for WLAN with MAC Interference Avoidance in Open Access Networks," pp. 1-11, EURASIP Journal on Wireless Communications and Networking, 2007: 051358. doi:10.1155/2007/51358.

(Continued)

*Primary Examiner* — James M Perez
(74) *Attorney, Agent, or Firm* — Patterson + Sheridan, LLP

(57) ABSTRACT

Embodiments herein describe recovering data packets received by a plurality of wireless antennas of a radio head. In one embodiment, the signals received by the radio head are filtered using a single filter to recover at least one data packet. In another embodiment, the signals received by the radio head are filtered using a plurality of filters to recover at least one data packet. In one embodiment, a controller coupled with the radio head filters the received signals and recovers the at least one data packet.

17 Claims, 7 Drawing Sheets

(56) References Cited

U.S. PATENT DOCUMENTS

| | | | | |
|---|---|---|---|---|
| 8,325,844 B2* | 12/2012 | Walton | H04B 7/0417 | 375/130 |
| 8,335,286 B2* | 12/2012 | Mergen | H04B 1/71072 | 375/148 |
| 8,385,489 B2* | 2/2013 | Azadet | H04L 25/0232 | 375/232 |
| 8,391,429 B2* | 3/2013 | Mergen | H04B 7/0452 | 375/148 |
| 8,411,806 B1* | 4/2013 | Lee | H04L 25/03305 | 375/340 |
| 8,451,944 B2* | 5/2013 | Gaur | H04B 7/0426 | 375/296 |
| 8,611,398 B2* | 12/2013 | Ancora | H04B 1/7097 | 375/148 |
| 8,792,576 B2* | 7/2014 | Kuwahara | H04L 25/03891 | 375/267 |
| 8,976,761 B2* | 3/2015 | Stager | H04W 24/02 | 370/334 |
| 8,995,594 B2* | 3/2015 | Kesling | H04B 1/38 | 375/220 |
| 9,001,867 B2* | 4/2015 | Wang | H04J 11/0036 | 370/317 |
| 9,191,080 B2* | 11/2015 | Yokomakura | H04L 1/0071 | |
| 9,319,079 B2* | 4/2016 | Eda | H04B 17/00 | |
| 9,350,543 B2* | 5/2016 | Kipnis | H04L 9/008 | |
| 9,369,309 B2* | 6/2016 | Seyama | H04L 25/0202 | |
| 9,571,268 B2* | 2/2017 | Kipnis | H04L 9/008 | |
| 9,584,278 B2* | 2/2017 | Hart | H04L 5/0048 | |
| 9,668,149 B1* | 5/2017 | Stager | H04L 43/16 | |
| 9,825,741 B2* | 11/2017 | Tabet | H04L 5/0048 | |
| 2002/0196842 A1* | 12/2002 | Onggosanusi | H04B 7/0417 | 375/148 |
| 2003/0026349 A1* | 2/2003 | Onggosanusi | H04B 7/0417 | 375/267 |
| 2004/0082356 A1* | 4/2004 | Walton | H04B 7/022 | 455/522 |
| 2004/0136349 A1* | 7/2004 | Walton | H04B 7/0417 | 370/338 |
| 2005/0002467 A1* | 1/2005 | Seo | H04B 7/061 | 375/267 |
| 2005/0111599 A1* | 5/2005 | Walton | H04B 1/71072 | 375/347 |
| 2006/0072677 A1* | 4/2006 | Kwak | H04B 7/0417 | 375/260 |
| 2007/0248172 A1* | 10/2007 | Mehta | H04B 7/024 | 375/260 |
| 2009/0279486 A1* | 11/2009 | Kishigami | H04B 7/0695 | 370/329 |
| 2009/0279644 A1* | 11/2009 | Maru | H04B 7/0413 | 375/340 |
| 2009/0310724 A1* | 12/2009 | Shah | H04B 7/0854 | 375/346 |
| 2010/0067365 A1* | 3/2010 | Furukawa | H04B 1/707 | 370/208 |
| 2010/0303182 A1* | 12/2010 | Daneshrad | H04B 1/7102 | 375/346 |
| 2011/0110451 A1* | 5/2011 | Tsai | H04B 7/0617 | 375/267 |
| 2011/0158361 A1* | 6/2011 | Dent | H04L 25/022 | 375/347 |
| 2011/0222486 A1* | 9/2011 | Hart | H04L 5/001 | 370/329 |
| 2011/0310827 A1* | 12/2011 | Srinivasa | H04B 7/0434 | 370/329 |
| 2012/0026938 A1* | 2/2012 | Pandey | H04L 43/065 | 370/328 |
| 2012/0051408 A1* | 3/2012 | Van Zelst | H04B 7/0413 | 375/219 |
| 2012/0077485 A1* | 3/2012 | Shin | H04B 7/0617 | 455/422.1 |
| 2013/0089040 A1* | 4/2013 | Tabet | H04L 5/0048 | 370/329 |
| 2013/0237261 A1* | 9/2013 | Bazzi | H04L 25/03343 | 455/501 |
| 2013/0267266 A1* | 10/2013 | Park | H04B 7/0456 | 455/501 |
| 2014/0003479 A1* | 1/2014 | Huang | H04B 1/1027 | 375/224 |
| 2014/0098681 A1* | 4/2014 | Stager | H04W 24/02 | 370/252 |
| 2014/0133523 A1* | 5/2014 | Xu | H04B 1/7103 | 375/148 |
| 2014/0140451 A1* | 5/2014 | Callard | H04B 1/1027 | 375/346 |
| 2014/0348120 A1* | 11/2014 | Kant | H04L 1/1835 | 370/329 |
| 2014/0362942 A1* | 12/2014 | Wood | H04B 15/00 | 375/267 |
| 2015/0131593 A1* | 5/2015 | Stager | H04W 24/02 | 370/329 |
| 2015/0139347 A1* | 5/2015 | Murch | H04B 7/0456 | 375/267 |
| 2015/0215123 A1* | 7/2015 | Kipnis | H04L 9/008 | 380/46 |
| 2015/0381221 A1* | 12/2015 | Cyzs | H04B 1/7097 | 375/346 |
| 2017/0126290 A1* | 5/2017 | Walton | H04B 7/043 | |
| 2017/0244451 A1* | 8/2017 | Raghavan | H04B 7/0408 | |
| 2017/0257868 A1* | 9/2017 | Wang | H04W 72/0466 | |

OTHER PUBLICATIONS

U.S. Appl. No. 15/163,915, filed May 25, 2016.

* cited by examiner

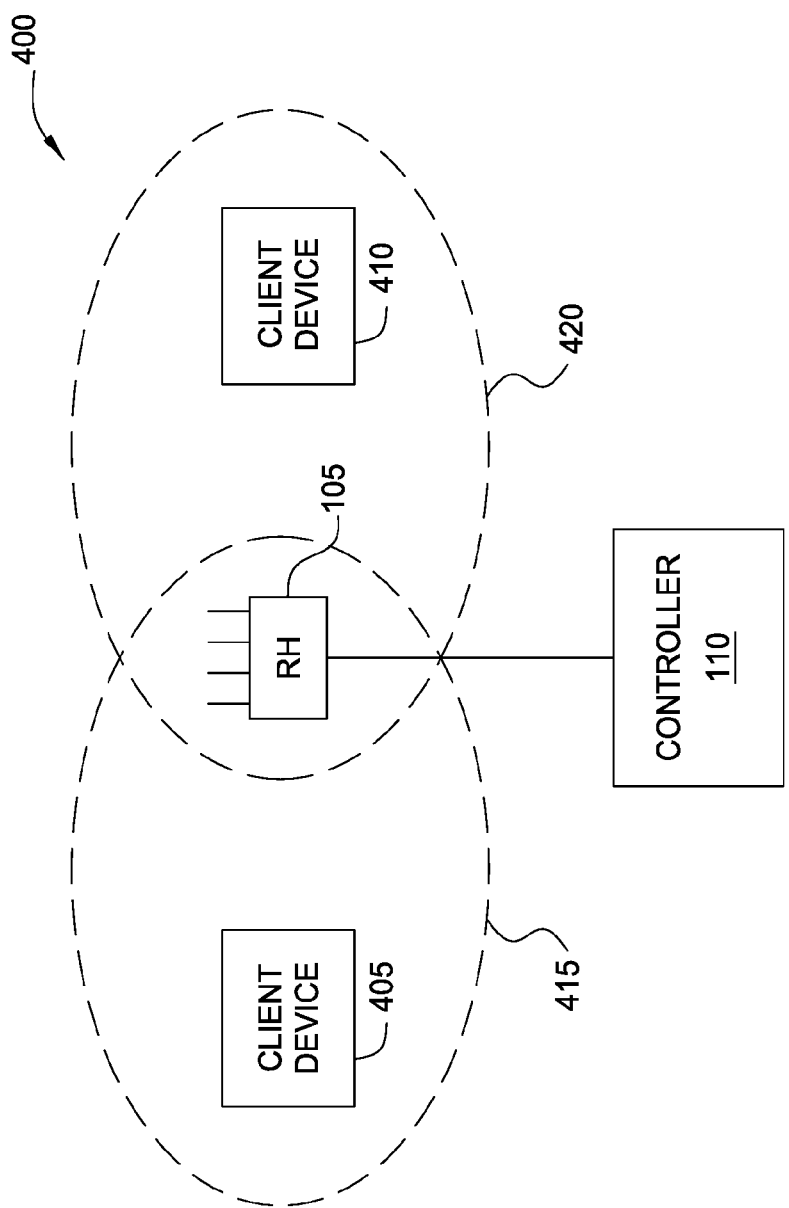

MINIMUM DELAY SPATIO-TEMPORAL FILTERING FOR INTERFERENCE REJECTION

TECHNICAL FIELD

Embodiments presented in this disclosure generally relate to wireless communications, and more specifically, to recovering data packets lost due to interference.

BACKGROUND

In wireless communication systems, a client device communicates with an access point (AP) to utilize the wireless network associated with the AP. An AP may have multiple radio heads for communicating with a client device. Modern wireless communication networks may have multiple APs having multiple antennas in order to provide multiple client devices simultaneous access to the wireless network. However, as the number of clients communicating on the wireless network increases, so does the amount of interference caused by the clients. Thus, every data packet communicated by the clients may not be received at the APs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate a plurality of clients communicating with a wireless system, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
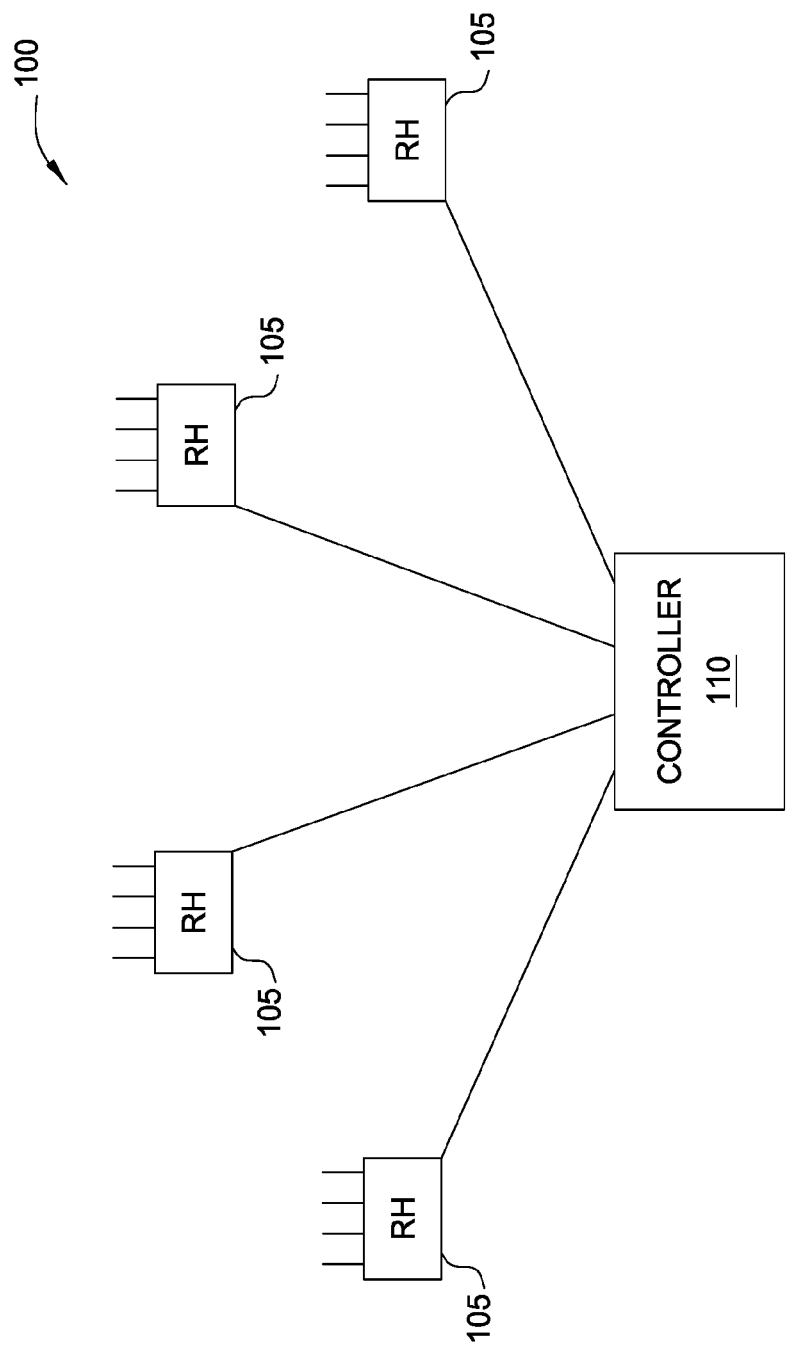
FIG. 1 illustrates a wireless system, according to one embodiment disclosed herein.

One embodiment presented in this disclosure is a method for recovering a data packet received at a radio head, wherein the radio head comprises a plurality of antennas. The method comprises receiving, via the plurality of antennas of the radio head, a first signal corresponding to a first data packet from a first client device and a second signal corresponding to a second data packet from a second client device, wherein each of the plurality of antennas of the radio head receives the first and second signal in parallel such that a collision occurs, wherein the first signal arrives before the second signal. The method also comprises determining a filter for the first signal based on the respective first signals received at the plurality of antennas. The method further comprises filtering the received first and second signals using the filter to mitigate interference caused by the first signal being received in parallel with the second signal. The method comprises recovering the second data packet corresponding to the second signal based on the filtered signals.

One embodiment presented in this disclosure is a system, comprising a processor; and a memory comprising instructions which, when executed on the processor, performs an operation for recovering a data packet received at a radio head, wherein the radio head comprises a plurality of antennas. The operation comprises receiving, via the plurality of antennas of the radio head, a first signal corresponding to a first data packet from a first client device and a second signal corresponding to a second data packet from a second client device, wherein each of the plurality of antennas of the radio head receives the first and second signal in parallel such that a collision occurs, wherein the first signal arrives before the second signal. The operation also comprises determining a filter for the first signal based on the respective first signals received at the plurality of antennas. The operation further comprises filtering the received first and second signals using the filter to mitigate interference caused by the first signal being received in parallel with the second signal. The operation comprises recovering the second data packet corresponding to the second signal based on the filtered signals.

A computer program product for recovering a data packet received at a radio head, wherein the radio head comprises a plurality of antennas. The computer program product comprises a non-transitory computer-readable medium program having program instructions embodied therewith, the program instructions executable by a processor to perform an operation. The operation comprises receiving, via the plurality of antennas of the radio head, a first signal corresponding to a first data packet from a first client device and a second signal corresponding to a second data packet from a second client device, wherein each of the plurality of antennas of the radio head receives the first and second signal in parallel such that a collision occurs, wherein the first signal arrives before the second signal. The operation also comprises determining a filter for the first signal based on the respective first signals received at the plurality of antennas. The operation further comprises filtering the received first and second signals using the filter to mitigate interference caused by the first signal being received in parallel with the second signal. The operation comprises recovering the second data packet corresponding to the second signal based on the filtered signals.

Example Embodiments

In wireless communications, Multiple-Input and Multiple-Output (MIMO) is a method of communicating between multiple transmit and receive antennas to take advantage of spatial diversity and spatial multiplexing. A common wireless system used today is Wi-Fi, which may be a Carrier-sense Multiple Access with Collision Avoidance (CSMA/CA) wireless system. Generally, when a client device wishes to communicate with a CSMA/CA wireless system, the client device listens to the channel (i.e., senses in-band carrier signals) associated with the wireless system to determine whether the channel is clear to send a data packet. If a client device detects communication on the channel, the client device waits for a period of time, which is generally random, before listening to the channel a second time to determine whether the channel is clear. Upon determining the channel is clear, the client device transmits a data packet via the channel. Each transmission is made up of two portions, a preamble and the payload. The preamble contains long training fields, which allows an AP to estimate the channel from the client to the AP. That is, the preamble allows the AP to synchronize with the signal before the payload of the frame arrives. The payload includes the data which the client is transmitting.

As more and more client devices access and use the wireless network, the likelihood of a collision among transmitted packets increases. For example, if two client devices attempt to communicate with an AP, the client devices will listen to the channel to see if the channel is clear. Both devices may determine that the channel is clear, and send a data packet via the channel at the same time. However, if the AP receives both packets from the clients at the same time, the AP may not be able to properly decode the packets due to the interference from the other transmitted packet. Stated differently, the packets from the client devices collide at the AP. Thus, due to the interference or collision, the AP is unable to properly decode the packet from the client devices. However, if the AP is able to determine a filter for one or more of the signals and apply the filter to remove the interference, the AP may be able to clearly identify one of the signals from the interference. Therefore, wireless network communications can be improved by filtering the interference or collision of data packets from client devices.

FIG. 1 illustrates a wireless network having multiple radio heads and a controller, according to one embodiment herein. As shown in FIG. 1, the wireless network 100 includes four radio heads (RHs) 105. Further, the RHs 105 are connected with a controller 110. In one embodiment, the controller 110 is implemented as a single computing device having any suitable form. In other embodiments, the controller 110 is a distributed computing device and includes a plurality of discrete computing devices that are connected through wired or wireless networking. While four RHs 105 have been illustrated for simplicity, the system may contain any number and type of radio heads, and should not be limited to the embodiment shown.

In one embodiment, the controller 110 communicates with the RHs 105. For example, the RHs 105 may be physically connected with the controller 110 via a wired connection, such as Ethernet cables, and the controller 110 communicates with the RHs 104 via the Ethernet cables. Further, the controller 110 may be connected to an external network (not shown), such as the Internet, or to additional RHs 105.

As shown in FIG. 1, each of the RHs 105 have four wireless antennas for communicating with client devices (not shown). In one embodiment, the RHs 105 communicate using the 802.11 protocol and form a single network for communicating with client devices, such as a MIMO network. Further, the RHs 105 may communicate with a client device using beamforming, as is known in the art. While the RHs 105 have been illustrated with four wireless antennas, it is to be understood that the RHs 105 may have any number of antennas and should not be limited only to four.

In one embodiment, the four RHs 105, as well as their respective wireless antennas, are synchronized via the controller 110. That is, each of the RHs 105 operate in unison with one another based on commands from the controller 110. In this manner, all the RHs 105 are precisely synchronized during communication to client devices. In one embodiment, the controller 110 synchronizes the RHs 105 using a high precision clock signal that is transmitted to each of the RHs 105.

Figure 2:
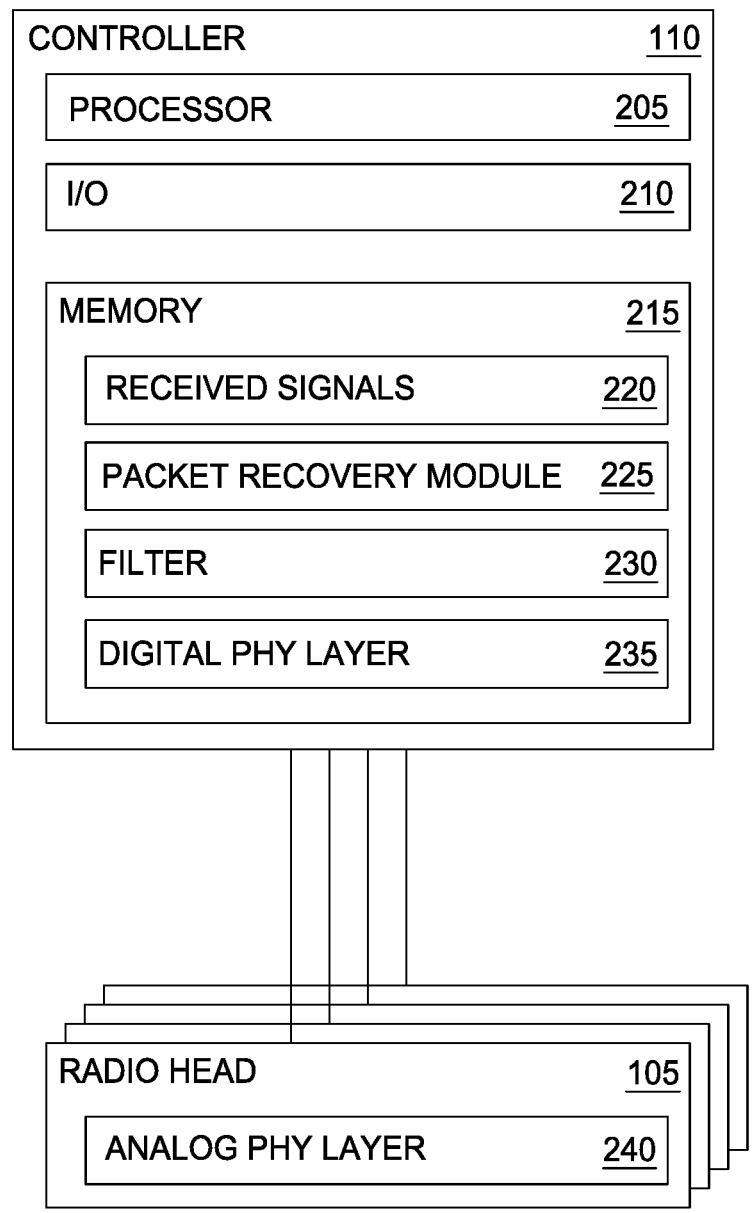
FIG. 2 illustrates a controller coupled with a plurality of radio heads, according to one embodiment disclosed herein.

Turning to FIG. 2, a detailed version of the controller 110 and the RHs 105 of FIG. 1 are illustrated according to one embodiment. The controller 110 comprises a processor 205, an input/output (I/O) interface 210, and a memory 215. The processor 205 controls the operation of the controller 110. The I/O interface 210 allows the controller 110 to communicate with other electronic devices (e.g., the RHs 105, client devices, network devices, etc.). For example, the I/O interface 210 may have physical data ports to establish a wired connection with the RHs 105. Further, the I/O interface 210 may be coupled with antennas for the controller 110 to communicate wirelessly.

The processor 205 may include any processing element suitable for performing functions described herein, and may include single or multiple core processors, as well as combinations thereof. While the controller 110 is shown as having a single processor 205, in alternative embodiments the controller 110 has a plurality of processors 205. The processor 205 may be included in a single computing device, or may represent an aggregation of processing elements included across a number of networked computing devices.

The memory 215 may include a variety of computer-readable media selected for their size, relative performance, or other capabilities: volatile and/or non-volatile media, removable and/or non-removable media, etc. The memory 215 may include cache, random access memory (RAM), Flash memory, a hard disk drive, a solid state drive, an optical storage device, and/or a magnetic storage device. As shown, the memory 215 includes received signals 220, packet recover module 225, filter 230, and the digital part of the PHY layer (i.e., Digital PHY Layer 235) of the RHs 105.

The received signals 220 are signals received at the RHs 105 that will be used by the packet recovery module 225. In one embodiment, the received signals 220 are signals from at least one client device received at each of the antennas of the RHs 105. For example, if one RH 105 has four antennas and receives a signal transmitted by a client device, the RH 105 will receive one signal for each of the four antennas. Thus, there are four received signals 220 in this example. In one embodiment, the received signals 220 are a matrix containing received signals for all of the antennas of each of the RH s105.

The memory 215 comprises a packet recovery module 225 and filter 230. In one embodiment, the packet recovery module 225 comprises software or firmware that when executed by the processor 205 performs a variety of functions for recovering a data packet. In another embodiment, the packet recovery module 225 recovers a data packet from a plurality of received signals, as will be discussed in further detail below with regards to FIG. 5. The filter 230 is used for filtering out one or more signals from the received signals 220. In one embodiment, the filter 230 is a single sub-band filter. In another embodiment, the filter 230 is a multiple sub-band filter. In a further embodiment, the packet recovery module 225 determines the characteristics of the filter. That is, the packet recovery module 225 determines the coefficients of the spatial filter to isolate or null at one or more signals from the received signals 220.

As one example, as will be explained further with regards to FIGS. 5 and 6, the packet recovery module 225 determines the characteristics of the filter 230 based on a plurality of received signals 220 such that at least one of the received signals 220 is filtered out. Once the received signals 220 are filtered, the packet recovery module 225 then recovers at least one data packet from the filtered signals. In one embodiment, the packet recovery module 330 recovers a data packet using the 802.11 wireless standard, which contains the Physical Layer Convergence Protocol (PLCP) sublayer. Specifically, in this embodiment, the packet recovery module 330 recovers a PLCP protocol data unit (PPDU) from the received signals. In one embodiment, packet recover module 225 determines characteristics for the filter 230 such that all received signals 220 except for the last arriving signal are removed. For example, if first and second signals arrive before a third signal, the packet recovery module 225 determines a filter 230 that removes the first and second signals. While a single filter has been shown for simplicity, a person skilled in the art would appreciate filter 230 may be more than one filter used to filter out a plurality of signals. For example, referring to the previous example of three arriving signals, the packet recovery module 225 determines a first filter 230 that may be used to filter out the first arriving signal and the packet recovery module 225 determines a second filter 230 that may be used to filter out the second arriving signal.

The memory 215 also comprises the digital PHY layer 235 which includes the functions for processing digital signals received at the RHs 105. In one embodiment, the memory 215 includes the MAC layer function of the RHs 105. Further, the MAC layer may include functions for channel access control. Thus, in one embodiment, the central controller 110 performs the digital PHY layer functions and the MAC layer functions for all of the RHs 105. While the digital PHY layer 235 and the MAC layer have been described as being within memory 215, a person skilled in the art would appreciate that the PHY layer and the MAC layer may be hardware, software, or a combination of hardware and software. Those skilled in the art should appreciate that memory 215 may contain additional items such as firmware for operating the controller 110, which have not been illustrated for simplicity.

The RHs 105 are illustrated with an analog PHY layer 240 that receives analog signals, digitizes the analog signals at baseband, and transmits wireless signals (i.e., an analog interface), while the central controller 110 includes the digital portion of a PHY layer and a MAC layer for processing received packets and transmitting packets to the RHs 105. Thus, the PHY layer may be split between the RHs 105 and the central controller 110 where the higher level processing layers are in the central controller 110. Alternatively, in an embodiment, the RHs 105 can include a processor (not shown) and memory (not shown) for processing digital signals received via the PHY layer. The RHs 105 may also include high-level processing layers (e.g., MAC or physical coding sublayer (PCS)) to evaluate the received packets.

Although not shown, the RHs 105 include one or more antennas for wireless communication. In one embodiment, the RHs 105 communicate using the 802.11 wireless communication standard via the one or more antennas. In another embodiment, the RHs 105 communicate with a cellular network. Further, the RHs 105 may comprise a plurality of antennas for communicating using different standards. For example, one antenna may be capable of communicating using the 802.11 wireless standard, while another antenna is capable of communicating with a cellular network. Thus, in some embodiments, the RHs 105 can communicate using a plurality of wireless networks.

FIG. 2 illustrates a distributed system with a central controller. That is, the RHs 105, which have a plurality of antennas, are distributed in an area so as to provide a wireless system. However, the RHs 105 forward received packets to the controller 110 and the controller 110 does the majority of processing for the wireless system. However, the packet recovery techniques described herein are not limited to a distributed system as illustrated in FIG. 2, but can also be used by an access point (AP) 300 shown in FIG. 3, which can receive and process communications from client devices without the reliance on a central controller.

Figure 3:
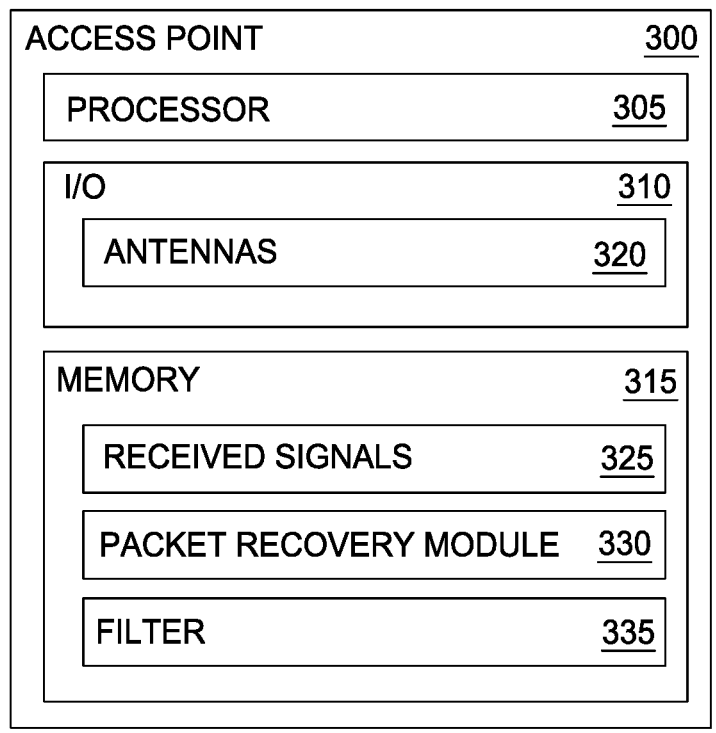
FIG. 3 illustrates a wireless system, according to one embodiment disclosed herein.

FIG. 3 illustrates the AP 300, according to one embodiment herein. The access point 300 comprises a processor 305, an input/output (I/O) interface 310, and a memory 315. The processor 305 controls the operation of the access point 300. The I/O interface 310 allows the access point 300 to communicate with other electronic devices (e.g., client devices, network devices, etc.). As shown the I/O interface 310 has antennas 320, which allows the access point 300 to communicate wirelessly. In one embodiment, the access point 300 is capable of communicating using the 802.11 wireless communication standard via the one or more antennas. In another embodiment, the access point 300 is capable of communicating with a cellular network. Further, the access point 300 may have a plurality of antennas for communicating using different standards. For example, one antenna may be capable of communicating using the 802.11 wireless standard, while another antenna is capable of communicating with a cellular network. Thus, in some embodiments, the access point 300 can communicate using a plurality of wireless networks. Further, the I/O 310 may also have physical data ports to establish a wired connection with other devices.

The processor 305 may include any processing element suitable for performing functions described herein, and may include single or multiple core processors, as well as combinations thereof. While the access point 300 is shown as having a single processor 305, in alternative embodiments the access point 300 has a plurality of processors 305. The processor 305 may be included in a single computing device, or may represent an aggregation of processing elements included across a number of networked computing devices.

The memory 315 may include a variety of computer-readable media selected for their size, relative performance, or other capabilities: volatile and/or non-volatile media, removable and/or non-removable media, etc. The memory 315 may include cache, random access memory (RAM), Flash memory, a hard disk drive, a solid state drive, an optical storage device, and/or a magnetic storage device. As shown, the memory 315 includes received signals 325, packet recovery module 330, and filter 335.

The received signals 335 are signals received from client devices (not shown) that will be used by the packet recovery module 330. In contrast to FIG. 2, where the processing of data packets is split between the RHs 105 and the controller 110, the AP 300 can receive and transmit communications without the reliance on a second device. In one embodiment, the received signals 325 are signals from at least one client device received at each of the antennas of the access point 300. For example, if the access point 300 has four antennas and receives a signal transmitted by a client device, the access point 300 will receive one signal for each of the four antennas. Thus, there are four received signals 325 in this example. In one embodiment, the received signals 325 are a matrix containing received signals for all of the antennas of each of the access point 300.

The memory 315 comprises a packet recovery module 330 and filter 335. In one embodiment, the packet recovery module 330 comprises program code that when executed by the processor 305 performs a variety of functions for recovering a data packet. In one embodiment, the packet recovery module 330 performs an operation for recovering a data packet from a plurality of received signals, as will be discussed in further detail below with regards to FIG. 5. In one embodiment, the packet recovery module 330 recovers a data packet using the 802.11 wireless standard, which contains the Physical Layer Convergence Protocol (PLCP) sublayer. Specifically, in this embodiment, the packet recovery module 330 recovers a PLCP protocol data unit (PPDU) from the received signals. The filter 335 is used for filtering out one or more signals from the received signals 325. In one embodiment, the packet recovery module 330 determines the characteristics of the filter. While a single filter has been shown for simplicity, a person skilled in the art would appreciate filter 335 may be more than one filter so as to filter out a plurality of signals.

FIG. 4A illustrates a wireless network with a radio head and a plurality of client devices, according to one embodiment herein. As shown in FIG. 4A, the wireless network 400 includes a RH 105 coupled with a controller 110. As shown, client device 405 has a communication range 415, which encompasses RH 105 such that the client device 405 can communicate with RH 105. Similarly, client device 410 has a communication range 420, which also encompasses RH 105 such that client device 410 can communicate with RH 105. However, communication range 415 does not extend far enough to encompass client device 410, and the communication range 420 does not extend far enough to encompass client device 405. Thus, while client devices 405 and 410 are able to communicate with RH 105, client devices 405 and 410 are not able to communicate with one another. Stated differently, the client devices 405 and 410 are unable to receive or monitor any transmission sent by the other client device, but the RH 105 can receive transmissions from both of the client devices 405 and 410. Therefore, a situation has been created in which the client devices 405 and 410 may both transmit a data packet at the same time to RH 105, which would result in interference, or a collision, between the transmissions from the client devices 405 and 410. A collision occurs when two data packets arrive at approximately the same time at the RH 105 such that interference between the two transmissions results in the preamble, the payload, or both of at least one of the data packets not being decoded properly. Thus, at least one of the data packets is not properly received by the RH 105 and is effectively lost.

For example, the client device 405 may listen to the channel and determine the channel is clear because no other device is communicating on the channel. Thus, the client device 405 may begin transmitting a data packet to the RH 105. At approximately the same time, the client device 410 listens to the channel to determine if the channel is clear. The client device 410 determines the channel is clear, even though the client device 405 has already started transmitting, because the client device 405 and the client device 410 are not within communication distance of each other. Thus, client device 410 also begins transmitting a data packet to the RH 105. However, because the client devices 405 and 410 have transmitted a data packet to the RH 105 at approximately the same time, the data packets collide, or interfere with one another, at the RH 105. This results in both data packets being decoded improperly due to the collision such that both data packets are effectively lost at RH 105. In one embodiment, the RH 105 received the entire preamble from at least one of the client devices 405 and 410 before the collision occurred. Thus, in this example, the RH 105 has received the channel state information from at least one of the client devices, which may be used to filter the signal.

Figure 4B:
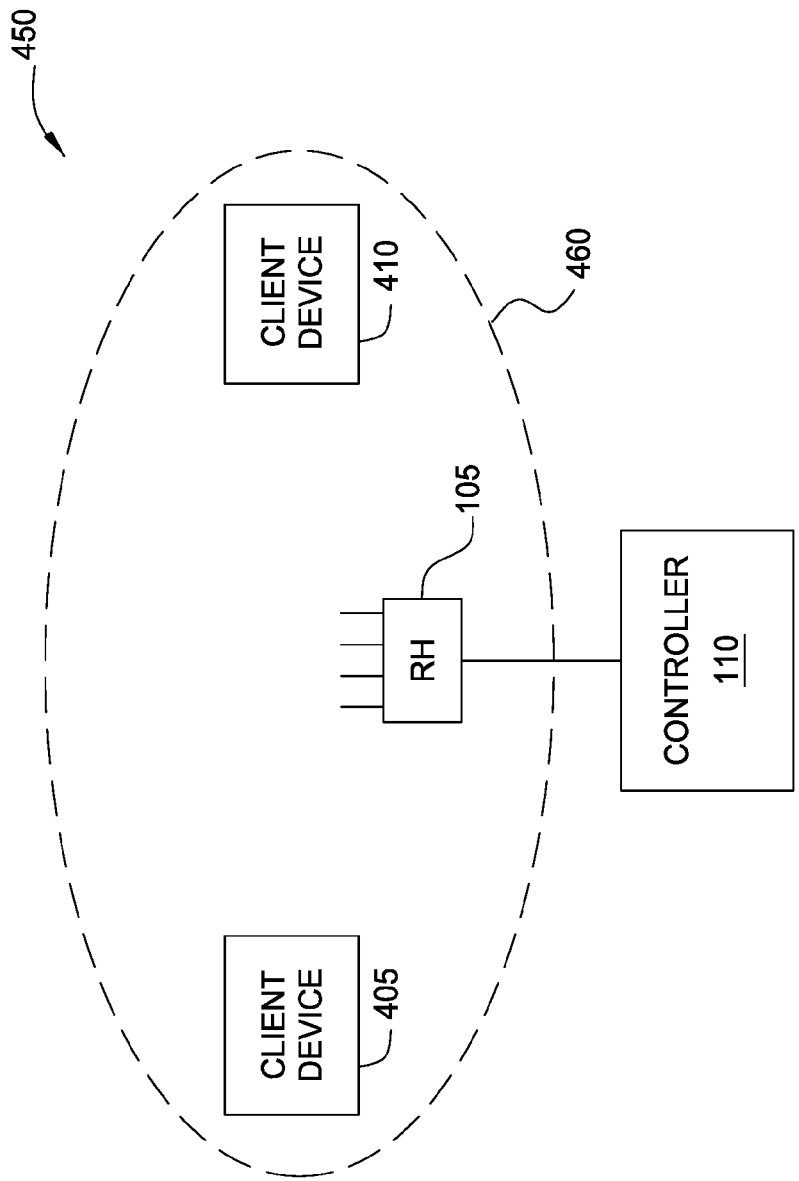

FIG. 4B illustrates a wireless network with a radio head and a plurality of client devices, according to one embodiment herein. As shown in FIG. 4B, the wireless network 450 includes a RH 105 coupled with a controller 110. As shown, the client devices 405 and 410, as well as RH 105, are within communication range 460 of each other. Thus, in contrast to FIG. 4A where the client devices 405 and 410 are not in communication range of each other, the client devices 405 and 410 in FIG. 4B are capable of monitoring transmissions from the other client device. However, it is still possible that the client devices 405 and 410 may transmit a data packet at approximately the same time to create a collision at RH 105.

For example, another device (not shown) may be transmitting on the channel to the RH 105. While the other device is transmitting, the client devices 405 and 410 may listen to the channel and recognize that the other device is transmitting. In response, the client devices 405 and 410 wait a period of time before monitoring the channel again. During the wait period, the other device has finished transmitting to the RH 105, and the channel is now clear. While the wait period is generally random, the client devices 405 and 410 may inadvertently wait a period of time that is approximately the same. Thus, once the client devices 405 and 410 wait their respective periods of time, the client devices 405 and 410 may monitor the channel at approximately the same time, and since the channel is now clear, both client devices 405 and 410 may begin to transmit a data packet to the RH 105 at approximately the same time. Thus, the data packets collide, or interfere with one another, at the RH 105. This results in both data packets being decoded improperly due to the collision such that both data packets are effectively lost at RH 105.

As another example, the RH 105 may solicit a response from the client devices 405 and 410. However, both client devices 405 and 410 may respond at approximately the same time to the request from the RH 105. Thus, a collision occurs between the data packets transmitted from the client devices 405 and 410. In this example, the client devices 405 and 410 may transmit the data packets to the RH 105 so close together in time that the preambles of both data packets overlap such that the RH 105 is unable to ascertain an channel state information from the transmissions. However, because the RH 105 previously communicated with the client devices 405 and 410 (i.e., solicited the response from the clients), the RH 105 already has the channel state information to communicate properly with the client devices 405 and 410, which may allow the signals to be filtered.

While two examples of a situation where a collision of packets may occur are provided above, a person skilled in the art will appreciate there are any number of scenarios in which a collision of packets may occur and the present application should not be limited to the aforementioned examples. Further, while two client devices and a single RH have been used for simplicity, any number of client devices and RHs may cause a collision. Indeed, as a person skilled in the art will appreciate, as the number of client devices per RH increases, the likelihood of a collision among data packets also increases. Furthermore, while FIGS. 4A-4B illustrate a RH 105 and a controller 110, a person skilled in the art will recognize a collision can occur when the access point 300 is used instead of the RH 105 and controller 110.

Figure 5:
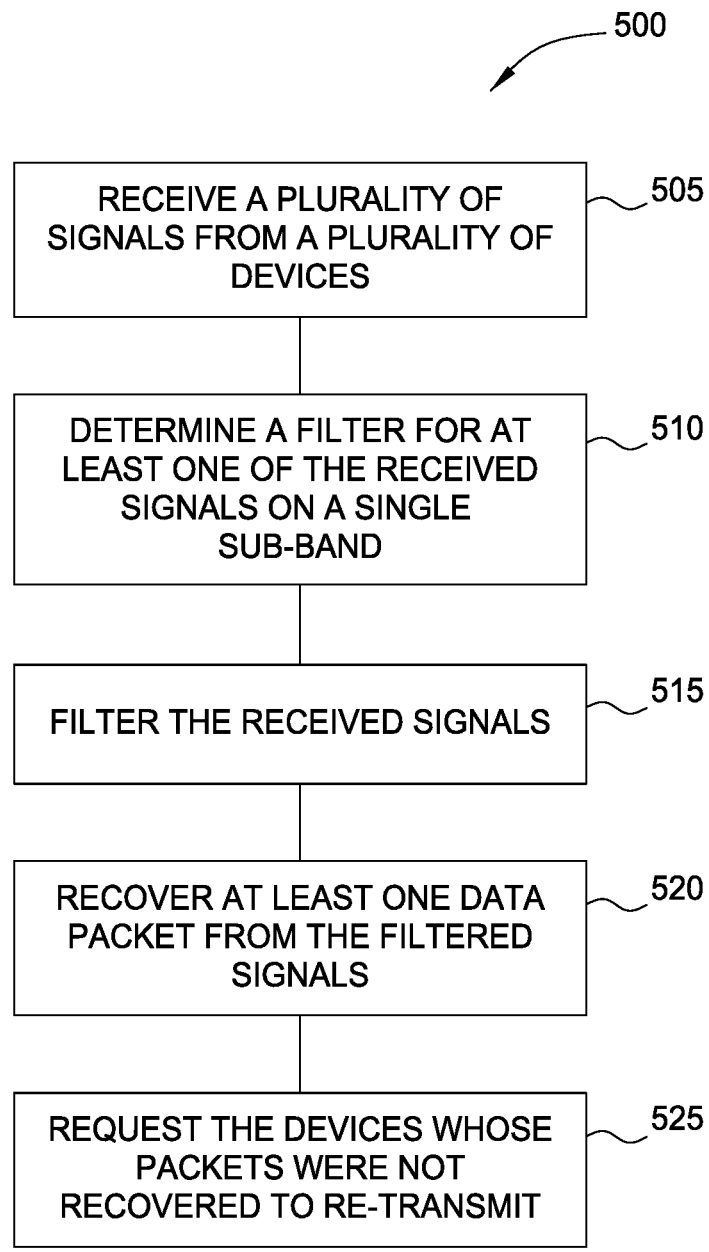
FIG. 5 illustrates a method of recovering a packet, according to one embodiment disclosed herein.

FIG. 5 illustrates a method 500 for recovering at least one data packet from a plurality of received signals using a single sub-band filter. In one embodiment, the method 500 filters out a first received signal in order to recover a second received signal. The method begins at block 505, where a plurality of signals are received from a plurality of devices. In one embodiment, two or more client devices each transmit a data packet to a RH at approximately the same time, which causes a collision. As a result of the collision, the controller is unable to properly decode the preamble, the payload, or both the preamble and the payload of the data packet corresponding to the first and/or second signal.

The following are several examples of a collision of a first signal and a second signal at a RH. Both the first and second signals contain data packets having a preamble and a payload. As one example of a collision, the first signal and the second signal arrive at the exact same time at the RH. Thus, the controller is unable to determine a preamble or a payload from either of the signals due to the interference from both signals.

As another example, the first signal arrives before the second signal. In this example, the first signal may arrive sufficiently before the second signal such that the RH is able to decode the preamble of the first signal. However, the second signal arrives before the packet corresponding to the first signal has been fully received, and as a result, the controller is unable to determine the preamble or payload of the first signal. Further, the controller is unable to determine the preamble of the second signal due to the interference from the first signal. Thus, the remaining portion of the packet of the second signal cannot be properly decoded even if this portion is received when the first signal has stopped.

As a further example, the first signal arrives at the RH at time 0 and the packet will be fully received at time 10. At some point after time 0, but before time 10, the second signal arrives at the RH to cause interference with the first signal. Thus, the arrival of the preamble and/or payload is not necessary for a collision. Rather, as the previous example illustrates, a collision occurs as long as the second signal arrives after the first signal is initially received at the RH and before the first signal is fully received at the RH.

At block 510, the packet recovery module 225 determines a filter for at least one of the received signals on a single sub-band. In one embodiment, the packet recovery module 225 determines the filter for the first signal before the second signal is received. As one example, the packet recovery module 225 begins to determine the filter for the first signal immediately after the first signal arrives at a RH. Thus, the filter is pre-emptively determined for the first signal without knowing the identity and channel characteristics of the second signal. By determining the filter before the collision occurs, the computational delay and overhead associated with the filter can be reduced. Therefore, the filter may be applied to the received signals as soon as the collision with the second signal occurs.

In one embodiment, the packet recovery module 225 determines a single sub-band filter based on the received signals. For example, the packet recovery module 225 determines a single spatial filter w to cancel interference across all K subcarriers of a single sub-band. In one embodiment, the packet recovery module 225 cancels the interference relying on only spatial degrees of freedom. To better explain spatial degrees of freedom, consider a receiver with four antennas. The receiver receives four independent receive chains via the four antennas, which directly correlate to the receiver's spatial degrees of freedom. That is, in this example, the receiver has four spatial degrees of freedom. The spatial degrees of freedom may be utilized to amply and attenuate signals come to the receiver. Further, a degree of freedom may be lost due to applying the spatial filter to the received signals. Thus, applying a single filter to a receiver with four antennas results in three spatial degrees of freedom.

The following definitions will be used throughout in determining the filter. M is the number of radio heads of the system. K is the number of subcarriers with the first subcarrier being the subcarrier with the lowest frequency and the Kth subcarrier is the subcarrier at the highest frequency of the band. S is the number of sub-bands used for analysis. With uniform allocation, there are K/S subcarriers per analysis sub-band. h(k) is the frequency domain channel response of the interference signal. H=[h(1), h(2), . . . , h(K)] is the collection of channel response vectors over the band for the interfering signal. H is a M×K matrix having complex entries. g(k) is the frequency domain channel response of the desired signal. G=[g(1), g(2), . . . , g(K)] is the collection of channel response vector over the band for the desired signal. While an interfering and a desired signal are referred to for ease of explanation, a person skilled in the art will appreciate that the two signals are interchangeable in that each signal interferes with the other.

In one embodiment, the packet recovery module 225 determines (at least one, non-zero) M×1 vector w when used as a receiver spatial weight vector that minimizes the energy from at least one of the users (i.e., at least one of the received signals) with channel response h(k) across the band of interest:

$$\min_w \sum_{k=1}^{K} |w^H h(k)|^2 = \min_w \sum_{k=1}^{K} w^H h(k) h^H(k) w = \min_w w^H \left( \sum_{k=1}^{K} h(k) h^H(k) \right) w$$

In order to avoid a trivial solution of an all-zeros vector, the norm of w is constrained to be unity ($w^H w = 1$). The frequency averaged channel response covariance matrix for the interference $R_{int}$ can be defined as:

$$R_{int} = \sum_{k=1}^{K} h(k) h^H(k) = HH^H$$

$R_{int}$ is a M×M Hermitian-symmetric matrix, positive semidefinite by its definition. Thus, $R_{int}$ has real eigenvalues and a full-set of orthogonal eigenvectors. With the above definition and the norm constraint, the determination of the filter can be expressed as:

$$\min_w w^H R_{int} w, \text{ subject to } w^H w = 1$$

For ease of explanation, assume the eigenvalues of $R_{int}$ are sorted in descending order $\{(\lambda_1, \lambda_2, \ldots, \lambda_M\}$ with corresponding eigenvectors: $\{e_1, e_2, \ldots, e_M\}$. By definition, the eigenvalues of $R_{int}$ are the squares of the singular values of H, and the eigenvectors of $R_{int}$ are the right singular vectors of H.

By Rayleigh-Ritz theorem on Hermitian symmetric matrices, the minimizer $w_{opt}$ of the constrained cost function is the eigenvector of $R_{int}$ with the smallest eigenvalue:

$$R_{int} w_{opt} = \lambda_M w_{opt}, \text{ in which: } w_{opt} = e_M \text{ and } \lambda_M \geq 0.$$

With the optimal selection $w_{opt}$, the cost:

$$\min_w \sum_{k=1}^{K} |w^H h(k)|^2$$

is equal to $\lambda_M$.

The eigenvector of the interference signal channel response covariance matrix $R_{int}$ with the smallest eigenvalue minimizes the interference power averaged across the sub-band. Stated differently, the eigenvector of $R_{int}$ with the smallest eigenvalue minimizes the interference across each of the subcarriers of the sub-band such that at least one of the received signals may be filtered out. This results in a single sub-band filter to be applied to the signals.

To better explain how the method filters out the interference signal, consider a radio head having four antennas. The radio head receives the interference signal at all four antennas, as well as the desired signal at all four antennas. Thus, there are four samples of the interference signal (i.e., one for each antenna). The above math is applied to the interference signals to determine a filter for the interference signal. The filter is then applied to the four received signals to filter out the interference signal. This results in three clear samples of the desired signal because one sample is lost due to applying the filter.

While the above solution provides a filter from a single eigenvector, the above solution may not have a favorable response to the desired signal. Stated differently, determining a single eigenvector for each subcarrier of a sub-band may not sufficiently filter the interference signal. Thus, finding additional eigenvectors for each subcarrier may improve the aforementioned solution. Therefore, finding additional eigenvectors that are orthogonal to $w_{opt}=e_M$, while keeping the cost function as small as possible among all solutions:

$$\sum_{k=1}^{K} |w^H h(k)|^2$$

improves the aforementioned result. Stated differently, instead of determining single minimum eigenvalue as described above, determining a plurality of minimum eigenvalues will be described below. In one embodiment, if a collision has not occurred once the single eigenvector is determined, the packet recovery module 225 determines additional eigenvectors to improve the filter until a collision occurs. In another embodiment, the packet recovery module 225 determines the filters in an iterative fashion such that only one filter is determined at a time.

While determining L additional vectors that are orthogonal to each other (or finding a L dimensional subspace V of the M dimensional coefficient space), the ideal result is to minimize the interference leakage across the sub-band. Thus, by determining the worst performing selection among the set of L vectors, the filter can be improved by removing these low performing vectors. The worst performing selection among the set of L vectors can be expressed as follows:

$$\min_{V, \dim(V)=L} \left\{ \min_{w \in V, \|w\|=1} \{w^H R_{int} w\} \right\}$$

By Ky-Fan's minimum-maximum principle on Hermitian symmetric matrices, the solution to the above problem (i.e., determining the worst performing vectors) consists of the set of eigenvectors with the L smallest eigenvalues of $R_{int}$:

$W=\{e_{M-L+1}, \ldots e_M\}$ with averaged interference leakage terms:$\{\lambda_{M-L+1} \ldots, \lambda_M\}$ Stated differently, the above math results in additional eigenvalues of the filter for each of the subcarriers of the sub-band. After the parallel solutions (columns of the matrix W defined above) are deployed, measurements can be processed per projected channel using the appropriate eigenvector by taking advantage of knowledge of the interference power per tone for each projected channel (in log-likelihood ratios for example). A projection solution can be rejected if the average interference leakage level is found to be unacceptably high. For example, for the projected measurements that use $e_M$, the interference power on k-th tone is equal to $|e_M^H h(k)|^2$.

Based on the math above, a plurality of the lowest L eigenvalues are determined which provide L different filters. The average may be taken of the L filters in order to filter out the interference signal. In this manner, the filter may be optimized in an iterative manner. As will be appreciated by one skilled in the art, as the number L increases, the accuracy of the filter also increases.

In another embodiment, the packet recovery module 225 determines a filter based on the maximized signal to interference plus noise ratio (SINR). The packet recovery module 225 determines a M×1 vector w when used as a receiver spatial weight vector that maximizes the ratio of the averaged energy of the desired signal with channel response g(k) over the band to that of the interfering signal with channel response h(k):

$$\max_w \frac{\sum_{k=1}^{K} |w^H g(k)|^2}{\sum_{k=1}^{K} |w^H h(k)|^2}$$

The above ratio of averaged signal and interference powers can be rewritten as:

$$\max_w \frac{\sum_{k=1}^{K} |w^H g(k)|^2}{\sum_{k=1}^{K} |w^H h(k)|^2} = \max_w \frac{w^H H H^H w}{w^H G G^H w}$$

Let us define:

$$R_{des} = \sum_{k=1}^{K} g(k) g^H(k) = GG^H$$

Then, the solution for the maximization problem is the generalized eigenvector of the matrix pencil $\{R_{des}, R_{int}\}$ with the largest generalized eigenvalue:

$R_{des} w_{opt} = \lambda_1 \cdot R_{int} w_{opt}$

In the presence of noise with spatial covariance matrix $R_n$, the principal component of the following equation needs to be determined:

$$R_{des} w_{opt} = \lambda_1 \cdot (R_{int} + R_n) w_{opt}$$

Generalized eigenvalues and eigenvectors can be computed by whitening the $R_{des}$ with the Cholesky factor of $(R_{int} + R_n)$:

$$(R_{int} + R_n) = LL^H$$

$$R_{des} w_{opt} = \lambda_1 \cdot LL^H w_{opt}$$

$$L^{-1} R_{des} L^{-H} (L^H w_{opt}) = \lambda_1 \cdot (L^H w_{opt})$$

Determine the principal eigenvector of $(L^{-1} R_{des} L^{-H})$ as $e_1$ and solve for $w_{opt}$ in $L^H w_{opt} = e_1$. Solving for $w_{opt}$ results in the optimized filter.

Finally, in order to receive both the desired signal and interference signal when they occur simultaneously, the principal generalized eigenvector needs to be determined from the following equation for capturing the interfering signal:

$$R_{int} w_{int} = \lambda_1 \cdot (R_{des} + R_n) w^{int}$$

If the noise power is negligible, then the maximum and minimum generalized eigenvectors can be determined from the matrix pencil $\{R_{des}, R_{int}\}$ as solutions for capturing desired signal and interference respectively which may cut down computations.

At block 515, the controller 110 filters the received signals. As an example, a RH 105 has four antennas and receives two transmitted signals at approximately the same time. After the filter has been determined from the above math, the method relies on the four degrees of freedom allowed by the four antennas of RH 105 to filter out the interfering signal. Assuming L=1 for simplicity, with four antennas, there is a 1×4 filter for each eigenvalue. Because there are four antennas and at least one degree of freedom must be used in order to determine the filter (i.e., the one antenna), there are still three degrees of freedom left due to the three remaining antennas. This results in three different filters being made for each of the degrees of freedom. These three filters are then concatenated, or stacked, to result in a 3×4 filter. This results in three different filters for a specific sub-band in order to filter out the interfering signal. Applying the filters to each of the three remaining antennas results in three separate filtered signals, where the interfering signal has been filtered out, and only the second signal remains.

At block 520, the controller 110 recovers at least one data packet from the filtered signals. As stated above, the interfering, or first signal, has been filtered out. Thus, the desired, or second received signal, can be decoded without interference. In this manner, the method allows for the second signal to be recovered from the collision. While two signals have been used for simplicity, a person skilled in the art will appreciate any number of signals may be used.

At block 525, the controller 110 requests the devices whose packets were not recovered to re-transmit each of the respective client devices data packets. In this manner, the controller 110 can filter out at least one data packet from a collision of data packets. The method concludes after block 525.

Figure 6:
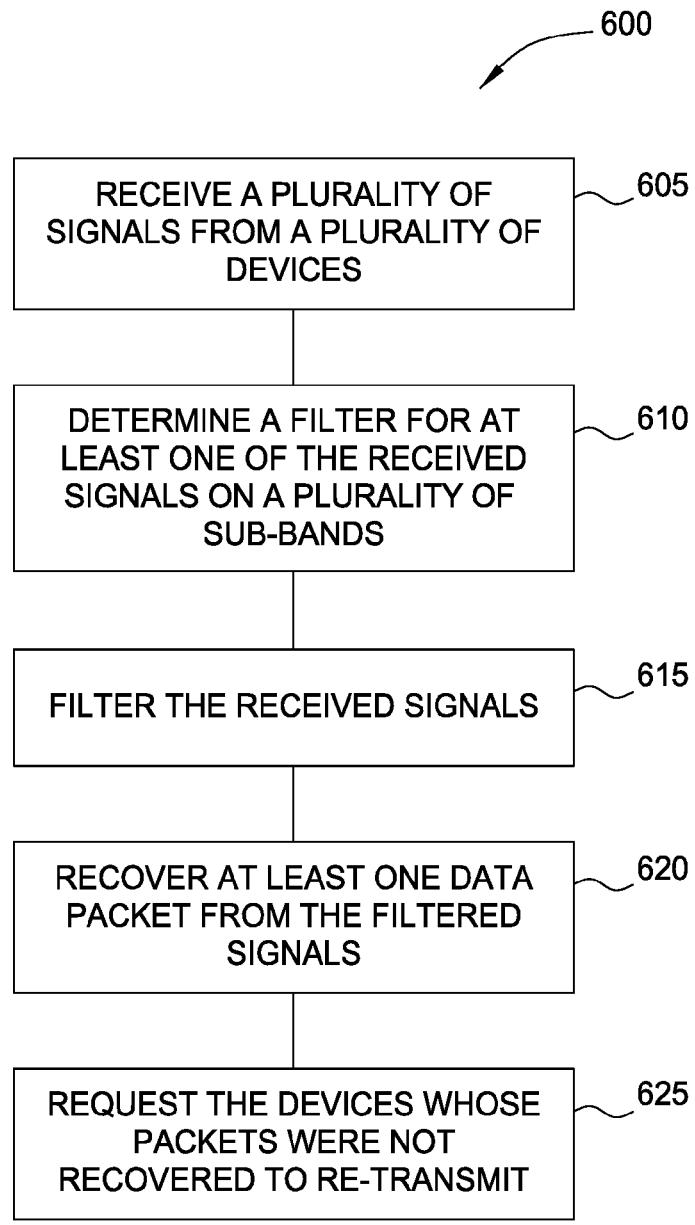
FIG. 6 illustrates a method of recovering a packet, according to one embodiment disclosed herein.

FIG. 6 illustrates a method 600 for recovering at least one data packet from a plurality of received signals using a plurality of sub-band filters. In one embodiment, the method 600 filters out a first received signal in order to recover a second received signal. The method begins at block 605, where a plurality of signals are received from a plurality of devices. In one embodiment, two or more client devices each transmit a data packet to RH which results in a collision where at least a portion of the data packets are received at the same time at the RH.

At block 610, the packet recovery module determines a filter for at least one of the received signals using a plurality of sub-bands. In one embodiment, the packet recovery module determines a filter for a plurality of sub-bands. To alleviate the demands on spatial processing, the band is partitioned into a set of S sub-bands using a filterbank that includes filters with frequency responses $\{A_1(k), \ldots, A_S(k)\}$, and each filter output is processed by a separate spatial filter $\{(w_1, \ldots, w_S)\}$.

The overall response of the filterbank followed by spatial filters on the interference channel for subcarrier k:

$$\sum_{s=1}^{S} w_s^H (A_s(k) \cdot h(k))$$

To determine the filter, the interference energy is minimized after sub-band filtering and projections are averaged over the entire band:

$$\min_{\{w_1, \ldots, w_S\}} \left\{ \sum_{k=1}^{K} \left| \sum_{s=1}^{S} A_s(k) \cdot w_s^H h(k) \right|^2 \right\}$$

Applying individual spatial filters having unit norm results in the following simplified equation:

$$w_s^H w_s = 1, s = 1, \ldots, S.$$

Using Lagrange multipliers results in:

$$C(w_1, \ldots, w_S, \mu_1, \ldots, \mu_S) =$$

$$\sum_{k=1}^{K} \left| \sum_{s=1}^{S} A_s(k) \cdot w_s^H h(k) \right|^2 + \sum_{s=1}^{S} \mu_s \cdot (w_s^H w_s - 1)$$

Due to quadratic nature of the cost function, the solution should be unique. Expanding the first summation results in:

$$C(w_1, \ldots, w_S, \mu_1, \ldots, \mu_S) =$$

$$\sum_{k=1}^{K} [A_1(k) \cdot w_1^H + \ldots + A_S(k) \cdot w_S^H] h(k) h^H(k) [A_1^*(k) \cdot w_1 + \ldots + A_S^*(k) \cdot w_S] +$$

$$\sum_{s=1}^{S} \mu_s \cdot (w_s^H w_s - 1)$$

If the sub-band filters were ideal (non-overlapping, product of two different filter frequency responses on any sub-carrier k is zero), then the multiple sub-band approach decouples into S separate single sub-band problems whose solution was determined previously as described above with reference to method 500 of FIG. 5.

Next, the gradient of the above cost function with respect to all spatial filters and the Lagrange multipliers is determined, and the results are set to zero. In one embodiment, when computing the gradient with respect to spatial filter k, $w_k^H$ is treated as the variable, and $w_k$ as a constant, together with any term related to other spatial filter coefficients. For example, the gradient with respect to the first spatial filter takes the form:

$$\sum_{k=1}^{K} \{A_1(k) \cdot [A_1^*(k) \cdot w_1 + \ldots + A_S^*(k) \cdot w_S] \cdot h(k) h^H(k)\} + \mu_1 \cdot w_1 = 0$$

Reorganizing the gradient with respect to the first spatial filter results in:

$$\left(\sum_{k=1}^{K} \{|A_1(k)|^2 \cdot h(k) h^H(k)\} + \mu_1 \cdot I\right) w_1 + \left(\sum_{k=1}^{K} A_1(k) \cdot A_2^*(k) \cdot h(k) h^H(k)\right) w_2 + \ldots + \left(\sum_{k=1}^{K} A_1(k) \cdot A_S^*(k) \cdot h(k) h^H(k)\right) w_S = 0$$

Let us define:

$$R_{i,j} = \sum_{k=1}^{K} (A_i(k) \cdot A_j^*(k)) \cdot h(k) h^H(k), \text{ for } 1 \le i, j \le S.$$

If the indices are swapped, the result is:

$R_{j,i} = R_{i,j}^H$

Note also that $R_{i,j}$ is Hermitian only if i=j.

With this definition and accompanying properties, the gradients are combined with respect to all spatial filters and setting them to zero, and obtain the following relationships:

$(R_{1,1}+\mu_1 \cdot I)w_1 + R_{1,2}w_2 + \ldots + R_{1,S}w_S = 0$ $R_{2,1}w_1 + (R_{2,2}+\mu_2 \cdot I)w_2 + \ldots + R_{2,S}w_S = 0$ $R_{S,1}w_1 + R_{S,2}w_2 + \ldots + (R_{S,S}+\mu_S \cdot I)w_S = 0$ In matrix form:

$$\begin{bmatrix} (R_{1,1}+\mu_1 \cdot I) & R_{1,2} & \ldots & R_{1,S} \\ R_{2,1} & (R_{2,2}+\mu_2 \cdot I) & \ldots & R_{2,S} \\ \vdots & \vdots & \ddots & \vdots \\ R_{S,1} & R_{S,2} & \ldots & (R_{S,S}+\mu_S \cdot I) \end{bmatrix} \begin{bmatrix} w_1 \\ w_2 \\ \vdots \\ w_S \end{bmatrix} = 0$$

If the sub-band filters are non-overlapping, then block-off-diagonal matrices ($R_{i,j}$, with $i \ne j$) are zero, and the multiple sub-band problem decouples into S single sub-band problems. An interpretation of the above equation is as follows: adjust parameters $\{\mu_1, \ldots, \mu_S\}$ so that the coefficient matrix becomes rank-deficient, and the eigenvector with zero eigenvalue of the resultant coefficient matrix becomes the solution for spatial filter coefficients for different bands.

Consider the case of two sub-bands:

$(R_{1,1}+\mu_1 \cdot I)w_1 + R_{1,2}w_2 = 0 \rightarrow w_1 = -(R_{1,1}+\mu_1 \cdot I)^{-1} R_{1,2} w_2$ $R_{2,1}w_1 + (R_{2,2}+\mu_2 \cdot I)w_2 = 0 \rightarrow w_2 = -(R_{2,2}+\mu_2 \cdot I)^{-1} R_{2,1} w_1$ Obtaining the relation for the two sub-bands results in:

$w_2 = (R_{2,2}+\mu_2 \cdot I)^{-1} R_{1,2}^H (R_{1,1}+\mu_1 \cdot I)^{-1} R_{1,2} w_2$ Adjust $\{\mu_1, \mu_2\}$ so that $(R_{2,2}+\mu_2 \cdot I)^{-1} R_{1,2}^H (R_{1,1}+\mu_1 \cdot I)^{-1} R_{1,2}$ has an eigenvalue that is equal to unity, and set $w_2$ equal to the corresponding eigenvector.

One way to simplify the above math is to relax the constraint from having individual spatial filters having unit norm to concatenated spatial filter vector having unit norm and is shown by:

$$\min_{\{w_1, \ldots, w_S\}} \left\{ \sum_{k=1}^{K} \left| \sum_{s=1}^{S} A_s(k) \cdot w_s^H h(k) \right|^2 \right\}$$

The above equation is subject to:

$$\sum_{s=1}^{S} w_s^H w_s = 1,$$

instead of $w_s^H w_s = 1$, for all s. Taking gradients with respect to the single constraint (represented by a single Lagrange multiplier $\mu$) results in:

$(R_{1,1}+\mu \cdot I)w_1 + R_{1,2}w_2 + \ldots + R_{1,S}w_S = 0$ $R_{2,1}w_1 + (R_{2,2}+\mu \cdot I)w_2 + \ldots + R_{2,S}w_S = 0$ $R_{S,1}w_1 + R_{S,2}w_2 + \ldots + (R_{S,S}+\mu \cdot I)w_S = 0$ In matrix form:

$$\begin{bmatrix} R_{1,1} & R_{1,2} & \ldots & R_{1,S} \\ R_{2,1} & R_{2,2} & \ldots & R_{2,S} \\ \vdots & \vdots & \ddots & \vdots \\ R_{S,1} & R_{S,2} & \ldots & R_{S,S} \end{bmatrix} \begin{bmatrix} w_1 \\ w_2 \\ \vdots \\ w_S \end{bmatrix} = -\mu \cdot \begin{bmatrix} w_1 \\ w_2 \\ \vdots \\ w_S \end{bmatrix}$$

In this case, the solution for the concatenated spatial filters is the eigenvector of the coefficient matrix with the smallest eigenvalue. Multiple sets of spatial filters reducing interference energy can be obtained if other eigenvectors of the coefficient matrix are included as in the single sub-band case. Furthermore, the dimensionality of the eigenvalue problem increased to M·S from M for the single sub-band case.

Another way to simplify the above math is to determine the spatial filter for each filter separately while ignoring coupling with other sub-band spatial filters. For example, for sub-band 1, consider the eigenvectors of the following matrix with the smallest eigenvalues:

$$\sum_{k=1}^{K} \{|A_1(k)|^2 \cdot h(k) h^H(k)\} + \sum_{k=1}^{K} \{|A_1(k) \cdot A_2^*(k)| \cdot h(k) h^H(k)\} + \ldots + \sum_{k=1}^{K} \{|A_1(k) \cdot A_S^*(k)| \cdot h(k) h^H(k)\}$$

Grouping terms, the eigenanalysis of the following matrix for the spatial filter selection for sub-band s (s=1, . . . , S):

$$\sum_{k=1}^{K} \left\{ \sum_{l=1}^{S} |A_s(k) \cdot A_l^*(k)| \right\} \cdot h(k) h^H(k)$$

Results from the above may be used to initialize an iterative algorithm targeting the original cost function. Considering alternative weight factors to $h(k)h^H(k)$ in the summation above by further analysis and simulations. The above computation can be further simplified for the spatial filters for sub-band s (s=1, . . . , S):

$$\sum_{k=1}^{K} |A_s(k)|^2 \cdot h(k)h^H(k)$$

Based on the above math, the filter is determined by averaging the filter across each sub-carrier. Then, after determining the eigenvalue associated with the weakest eigenvectors, break the filter into multiple sub-bands. Stated differently, decomposing the matrix above results in eigenvectors that illustrate how a receiver would precode and/or decode over the channel between two devices to either magnify the signals between the two devices or minimize the signals between the two devices. In order to filter the signal, the lowest eigenvalue would attenuate, or null, the signal. Thus, a solution is determined for each individual sub-band, and then the solution is determined iteratively for each sub-band to determine a more optimal solution.

At block 615, the controller 110 filters the received signals. As stated above, if there are two signals received at the RH, the first received signal is filtered out such that only the second received signal remains.

At block 620, the controller 110 recovers at least one data packet from the received signals. As stated above, the interfering, or first signal, has been filtered out. Thus, the desired, or second received signal, can be decoded without interference. In this manner, the method allows for the second signal to be recovered from the collision. While two signals have been used for simplicity, a person skilled in the art will appreciate any number of signals may be used.

At block 625, the controller 110 instructs the devices whose packets were not recovered to re-transmit each of the respective client devices data packets. In this manner, the controller 110 can filter out at least one data packet from a collision of data packets. The method concludes after block 625.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for recovering a data packet received at a radio head, wherein the radio head comprises a plurality of antennas, the method comprising:
   receiving, via the plurality of antennas of the radio head, a first signal corresponding to a first data packet from a first client device and a second signal corresponding to a second data packet from a second client device, wherein each of the plurality of antennas of the radio head receives the first and second signals in parallel such that a collision occurs, wherein the first signal arrives before the second signal;
   determining a filter for the first signal based on the respective first signals received at the plurality of antennas;
   filtering the received first and second signals using the filter, by determining the smallest eigenvector of a matrix comprising the received first and second signals;
   recovering the second signal based on the filtered signals; and
   recovering the second data packet corresponding to the recovered second signal based on the filtered signals.

2. The method according to claim 1, wherein a channel comprises a plurality of sub-bands and filtering the first signal further comprises:
   determining a respective filter for each of the plurality of sub-bands of the channel associated with the radio head,
   determining an average filter from the respective filters, and
   applying the averaged filter to the received first and second signals.

3. The method according to claim 1, further comprising:
   receiving, via the plurality of antennas of the radio head, more than two signals, wherein each signal corresponds to a respective data packet and the more than two signals are received at the radio head in parallel such that a collision occurs;
   determining a respective filter for each of the more than two received signals except for a last arriving signal;
   filtering the more than two signals from the received signals based on the respective filters, wherein the respective filters at least partially remove the interference caused by at least one of the more than two received signals; and
   recovering a data packet from the last arriving signal.

4. The method according to claim 1, wherein filtering the first signal begins before the second signal is received, wherein the filter is based only on the received first signal, and wherein a data packet from the first signal is not recovered, the method further comprising:
   requesting the first client device re-transmits the first signal.

5. The method according to claim 1, wherein determining the filter further comprises determining a respective filter for each of a plurality of different subcarriers of a frequency band.

6. The method according to claim 1, wherein the radio head is communicatively coupled with a controller, wherein the controller is configured to:
   process data received at the radio head,
   filter the first and second received signals, and
   recover the data packet from the second signal.

7. A system, comprising:
   a processor; and
   a memory comprising instructions which, when executed on the processor, performs an operation for recovering a data packet received at a radio head, wherein the radio head comprises a plurality of antennas, the operation comprising:
      receiving, via the plurality of antennas of the radio head, a first signal corresponding to a first data packet from a first client device and a second signal corresponding to a second data packet from a second client device, wherein each of the plurality of antennas of the radio head receives the first and second signals in parallel such that a collision occurs, wherein the first signal arrives before the second signal;
      determining a filter for the first signal based on the respective first signals received at the plurality of antennas;
      filtering the received first and second signals using the filter to mitigate interference caused by the first signal being received in parallel with the second signal, wherein filtering the received first and second signals comprises determining the smallest eigenvector of a matrix comprising the plurality of received first and second signals;

recovering the second signal based on the filtered signals; and recovering the second data packet corresponding to the second signal based on the filtered signals.

8. A system, comprising:
a processor; and
a memory comprising instructions which, when executed on the processor, performs an operation for recovering a data packet received at a radio head, wherein the radio head comprises a plurality of antennas, the operation comprising:
receiving, via the plurality of antennas of the radio head, a first signal corresponding to a first data packet from a first client device and a second signal corresponding to a second data packet from a second client device, wherein each of the plurality of antennas of the radio head receives the first and second signals in parallel such that a collision occurs, wherein the first signal arrives before the second signal;
determining a filter for the first signal based on the respective first signals received at the plurality of antennas;
filtering the received first and second signals using the filter, wherein a channel comprises a plurality of sub-bands and filtering the first signal comprises:
determining a respective filter for each of the plurality of sub-bands of the channel associated with the radio head,
determining an average filter from the respective filters, and
applying the averaged filter to the received first and second signals; and
recovering the second data packet corresponding to the second signal based on the filtered signals.

9. The system according to claim 7, the operation further comprising:
receiving, via the plurality of antennas of the radio head, more than two signals, wherein each signal corresponds to a respective data packet and the more than two signals are received at the radio head in parallel such that a collision occurs;
determining a respective filter for each of the more than two received signals except for a last arriving signal;
filtering the more than two signals from the received signals based on the respective filters, wherein the respective filters at least partially remove the interference caused by at least one of the more than two received signals; and
recovering a data packet from the last arriving signal.

10. The system according to claim 7, wherein determining the filter further comprises determining a respective filter for each of a plurality of different subcarriers of a frequency band.

11. The system according to claim 7, wherein the radio head is communicatively coupled with a controller, wherein the controller is configured to:
process data received at the radio head,
filter the first and second received signals, and
recover the data packet from the second signal.

12. A system, comprising:
a processor; and
a memory comprising instructions which, when executed on the processor, performs an operation for recovering a data packet received at a radio head, wherein the radio head comprises a plurality of antennas, the operation comprising:
receiving, via the plurality of antennas of the radio head, a first signal corresponding to a first data packet from a first client device and a second signal corresponding to a second data packet from a second client device, wherein each of the plurality of antennas of the radio head receives the first and second signals in parallel such that a collision occurs, wherein the first signal arrives before the second signal;
determining a filter for the first signal based on the respective first signals received at the plurality of antennas;
filtering the received first and second signals using the filter, wherein filtering the first signal begins before the second signal is received, wherein the filter is based only on the received first signal, and wherein a data packet from the first signal is not recovered;
requesting the first client device re-transmits the first signal; and
recovering the second data packet corresponding to the second signal based on the filtered signals.

13. A computer program product for recovering a data packet received at a radio head, wherein the radio head comprises a plurality of antennas, the computer program product comprising a non-transitory computer-readable medium program having program instructions embodied therewith, the program instructions executable by a processor to perform an operation comprising:
receiving, via the plurality of antennas of the radio head, a first signal corresponding to a first data packet from a first client device and a second signal corresponding to a second data packet from a second client device, wherein each of the plurality of antennas of the radio head receives the first and second signals in parallel such that a collision occurs, wherein the first signal arrives before the second signal;
determining a filter for the first signal based on the respective first signals received at the plurality of antennas;
filtering the received first and second signals using the filter by determining the smallest eigenvector of a matrix comprising the plurality of received first and second signals;
recovering the second signal based on the filtered signals; and
recovering the second data packet corresponding to the second signal based on the filtered signals.

14. The computer program product according to claim 13, wherein a channel comprises a plurality of sub-bands and filtering the first signal further comprises:
determining a respective filter for each of the plurality of sub-bands of the channel associated with the radio head,
determining an average filter from the determined filters, and
applying the averaged filter to the received first and second signals.

15. The computer program product according to claim 13, the operation further comprising:
receiving, via the plurality of antennas of the radio head, more than two signals, wherein each signal corresponds to a respective data packet and the more than two signals are received at the radio head in parallel such that a collision occurs;
determining a respective filter for each of the more than two received signals except for a last arriving signal;

filtering the more than two signals from the received signals based on the respective filters, wherein the respective filters at least partially remove the interference caused by at least one of the more than two received signals; and recovering a data packet from the last arriving signal.

16. The computer program product according to claim 13, wherein filtering the first signal begins before the second signal is received, wherein the filter is based only on the received first signal, and wherein a data packet from the first signal is not recovered, the operation further comprising:

requesting the first client device re-transmits the first signal.

17. The computer program product according to claim 13, wherein determining the filter further comprises determining a respective filter for each of a plurality of different subcarriers of a frequency band.

* * * * *